(12) United States Patent
Bornstein et al.

(10) Patent No.: US 8,971,223 B2
(45) Date of Patent: Mar. 3, 2015

(54) WIRELESS PERSONAL AREA NETWORK COORDINATOR

(75) Inventors: Gilad Bornstein, Haifa (IL); Baruch Eruchimovitch, Haifa (IL); Nir Strauss, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 12/777,527

(22) Filed: May 11, 2010

(65) Prior Publication Data

US 2011/0280167 A1 Nov. 17, 2011

(51) Int. Cl.
*G08C 17/00* (2006.01)
*H04W 52/02* (2009.01)
*H04W 84/18* (2009.01)

(52) U.S. Cl.
CPC ............ *H04W 52/0251* (2013.01); *Y02B 60/50* (2013.01); *H04W 84/18* (2013.01)
USPC ........................................................ 370/311

(58) Field of Classification Search
USPC ......... 370/203, 204–215, 229–240, 310–337, 370/395.3, 395.4, 395.41, 395.42, 395.5, 370/395.52, 431–529, 523–520
See application file for complete search history.

(56) References Cited

U.S. PATENT DOCUMENTS

| | | | |
|---|---|---|---|
| 5,487,181 A * | 1/1996 | Dailey et al. .................. | 455/90.2 |
| 7,525,413 B2 * | 4/2009 | Jung et al. ..................... | 340/10.1 |
| 2005/0141470 A1 * | 6/2005 | Jung et al. ..................... | 370/338 |
| 2005/0288069 A1 * | 12/2005 | Arunan et al. ................ | 455/574 |
| 2006/0083168 A1 * | 4/2006 | Prakash ........................ | 370/230 |
| 2007/0237122 A1 | 10/2007 | Liu et al. | |
| 2008/0261663 A1 * | 10/2008 | Park et al. ..................... | 455/574 |
| 2009/0124301 A1 * | 5/2009 | Raissinia ...................... | 455/574 |
| 2009/0285140 A1 * | 11/2009 | Kim et al. ..................... | 370/311 |
| 2010/0077404 A1 * | 3/2010 | Oh et al. ....................... | 719/313 |
| 2010/0115302 A1 * | 5/2010 | Cho et al. ...................... | 713/310 |
| 2010/0165896 A1 * | 7/2010 | Gong et al. .................... | 370/311 |
| 2010/0195557 A1 | 8/2010 | Aoki | |
| 2011/0116429 A1 | 5/2011 | Jeon et al. | |

FOREIGN PATENT DOCUMENTS

| | | |
|---|---|---|
| JP | 2011501488 A | 1/2011 |
| JP | 2012503892 A | 2/2012 |
| KR | 20090129304 A | 12/2009 |
| WO | WO2007064145 A1 | 6/2007 |
| WO | WO-2009013969 A1 | 1/2009 |
| WO | WO-2009047179 A1 | 4/2009 |
| WO | WO-2009151289 A2 | 12/2009 |

OTHER PUBLICATIONS

Liu, Z. et al., "A Traffic Modeling Based Power Saving Mechanism for Mobile Devices in Wireless Systems", Communication Networks and Services Research Conference, May 2008, pp. 107-114.

(Continued)

*Primary Examiner* — Jung-Jen Liu (57) ABSTRACT

Systems and methods for saving power by a personal area network (PAN) coordinator are described herein. A PAN coordinator is provided to form a wireless PAN with one or more devices. Further, the PAN coordinator enters a sleep state to save power. The wireless PAN is available when the PAN coordinator enters an active state.

23 Claims, 4 Drawing Sheets

(56) References Cited

OTHER PUBLICATIONS

IEEE Computer Society: "IEEE Std 802.15.4-2006 (Revision of IEEE Std 802.15.4-2003); Part 15.4: Wireless Medium Access Control (MAC) and Physical Layer (PHY) Specifications for Low-Rate WirelessPersonal Area Networks (WPANs); pp. 1-24 and 166-169", IEEE, 3 Park Avenue New York, NY 10016-5997, USA IEEE Std 802.15.4, Sep. 8, 2006, XP002656040, New York, USA Retrieved from the Internet: URL:http://standards.ieee.org/getieee802/download/802.15.4-2006.pdf [retrieved on Aug. 2, 2011] p. 5, par. 3.7 and par. 3.9; p. 6, par. 3.33; p. 7, par. 3.44; pp. 14/15, par. 5.3 and par. 5.3.1; pp. 17/18, par. 5.5.1, Figs. 4 and 5; p. 20, par. 5.5.2.2, Figs. 8 and 9; p. 167, par. 7.5.1.1.

International Search Report and Written Opinion—PCT/US2011/036130—ISA/EPO—Aug. 22, 2011.
Tae Rim Park et al: "Power saving algorithms for wireless sensor networks on IEEE 802.15.4", IEEE Communications Magazine, IEEE Service Center, Piscataway, US, vol. 46, No. 6, Jun. 1, 2008, pp. 148-155, XP011227797, ISSN: 0163-6804, DOI: DOI:10.1109/MCOM.2008.4539479 abstract p. 149, col.1, lines 1-16 of par. IEEE 802.15.4.
European Search Report—EP14163342—Search Authority—Munich—Jul. 28, 2014.
Jurdak R. et al., "Adaptive Radio Modes in Sensor Networks: How Deep to Sleep?," Sensor, Mesh and Ad Hoc Communications and Networks, 2008. SECON '08. 5th Annual IEEE Communications Society Conference on, IEEE, Piscataway, NJ, USA, Jun. 16-20, 2008, pp. 386-394, XP031282614.

\* cited by examiner

WIRELESS PERSONAL AREA NETWORK COORDINATOR

BACKGROUND

1. Field

This application relates generally to personal area networks (PANs), and more specifically to a ZigBee coordinator configured to save power.

2. Background

A personal area network (PAN) is a communication network among multiple computing devices close to one's person. In a typical PAN, a coordinator forms the root of the network tree. The coordinator connects to one or more devices. Accordingly, a coordinator may communicate with one or more devices. However, in a typical PAN, the coordinator always remains on as it is the root of the network tree. Remaining on requires the coordinator to continuously use power. Thus, a need exists for a coordinator that can reduce power use.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include a coordinator configured to save power.

One aspect of the disclosure is a personal area network (PAN) coordinator. The PAN coordinator comprises a queue configured to store one or more messages destined for one or more devices. The PAN coordinator is configured to initiate formation of a wireless PAN with one or more devices. The PAN coordinator transitions from an active state to a sleep state subsequent to a first condition being met. The PAN coordinator transitions from the sleep state to the active state subsequent to a second condition being met.

Another aspect of the disclosure is a method of saving power by a personal area network (PAN) coordinator. The method comprises storing one or more messages destined for one or more devices. The method further comprises initiating formation of a wireless PAN with one or more devices. The method further comprises transitioning from an active state to a sleep state subsequent to a first condition being met. The method further comprises transitioning from the sleep state to the active state subsequent to a second condition being met.

Yet another aspect of the disclosure is a wireless apparatus. The wireless apparatus comprises means for storing one or more messages destined for one or more devices. The wireless apparatus further comprises means for initiating formation of a wireless personal area network (PAN) with one or more devices. The wireless apparatus further comprises means for transitioning from an active state to a sleep state subsequent to a first condition being met The wireless apparatus further comprises means for transitioning from the sleep state to the active state subsequent to a second condition being met.

A further aspect of the disclosure is a computer program product, comprising computer-readable medium. The computer-readable medium comprises code for causing a computer to store one or more messages destined for one or more devices. The computer-readable medium further comprises code for causing a computer to initiate formation of a wireless personal area network (PAN) with one or more devices. The computer-readable medium further comprises code for causing a computer to transition from an active state to a sleep state subsequent to a first condition being met. The computer-readable medium further comprises code for causing a computer to transition from the sleep state to the active state subsequent to a second condition being met.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various personal area networks such as Z-Wave, 6LowPAN, Synkro, Wireless HART, MIWi, SP100, ZigBee networks, Bluetooth, etc. These various communication technologies are known in the art. For clarity, certain aspects of the methods and devices are described for a ZigBee system that implements a ZigBee network.

Traditionally, a ZigBee network comprises two or more ZigBee devices that communicate with each other. One type of ZigBee device is a coordinator ("coordinator"). A coordinator may form the "root" of a "network tree." Accordingly, the coordinator may initiate and maintain the network. Accordingly, the coordinator may store information about the network. Further, the coordinator may act as a bridge to other networks. Another type of ZigBee device is a ZigBee End Device ("device"). The device may receive messages or commands from the coordinator. A coordinator may form a network (e.g., pair) with one or more devices.

The methods and devices described herein correspond to a coordinator configured to save power. The coordinator may enter a power-saving state (e.g., sleep state) when not in use.

Figure 1:
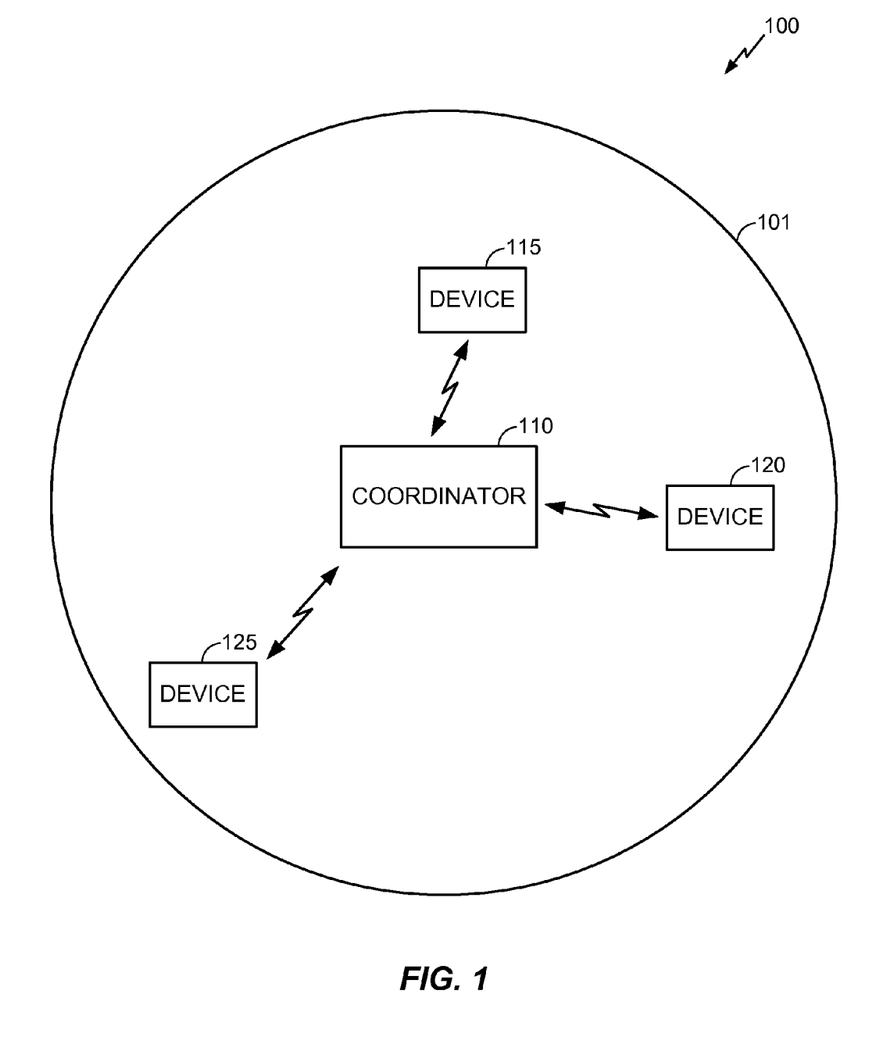
FIG. 1 is a diagram illustrating an exemplary personal area network.

FIG. 1 is a diagram illustrating an exemplary personal area network. The PAN 100 comprises a coordinator 110 configured to communicate with one or more devices (e.g., devices 115, 120, 125) in a coverage area 101. The coordinator 110 is configured to store commands to be performed by the devices 115, 120, 125. For example, a user of the coordinator 110 may input a command (e.g., job) for the device 115 at the coordinator 110. The coordinator 110 may store the commands in a memory such as in a queue at the coordinator 110. Further, the devices 115, 120, 125 in the PAN 100 are configured to poll the coordinator for any commands pending for the respective device 115, 120, 125. For example, the device 115 may periodically poll the coordinator for pending command(s). If command(s) are pending, the coordinator 110 may communicate the command(s) to the device 115. The device 115 may then perform the communicated command(s). Further, the devices 115, 120, 125 may be configured to connect to the coordinator 110 and communicate over a communication channel. Though not shown, the PAN 100 may further comprise additional devices.

In one embodiment, before the devices 115, 120, 125 communicate with coordinator 110, the devices 115, 120, 125 and the coordinator 110 associate or "pair." Pairing is a process by which the devices 115, 120, 125 register with the coordinator 110, including under user control. Once paired, devices 115, 120, 125 typically can communicate with the coordinator 110 whenever they are within range and active without re-performing the pairing process.

Before pairing, the devices 115, 120, 125 and the coordinator 110 must first discover each other, for example, by entering a discoverable state in which devices 115, 120, 125 and the coordinator 110 discover each other through the exchange of discovery messages. Upon discovery, devices 115, 120, 125 and the coordinator 110 may pair with each other. Pairing is at least partly a security function to limit pairing to particular devices. For example, pairing may include an exchange of messages that may include password authentication schemes in which a first device and/or coordinator must respond with a password (such as a four digit number, which is often fixed at the factory for a device and/or a coordinator) to a second device and/or coordinator to prevent unauthorized or undesired pairing of devices. In networking protocols such as Bluetooth, discovery and pairing are separate procedures. However, they are most often performed together. Once paired, the devices 115, 120, 125 and the coordinator 110 are registered with each other and may automatically connect when within range and active.

In one embodiment, after association, the devices 115, 120, 125 may enter a sleep state. In the sleep state, the devices may use some power, but do not actively transmit/receive information. The devices 115, 120, 125 may wake up from the sleep state and enter an active state. The devices 115, 120, 125 may be configured to periodically wake up (e.g., every few seconds). The devices 115, 120, 125 may further be configured to send a message to the coordinator 110. If the devices 115, 120, 125 receive a response from the coordinator 110 they may respond based on the response. If the devices 115, 120, 125 do not receive a response from the coordinator 110 they may go back to a sleep state. The devices 115, 120, 125 may wait for a set period of time (e.g., a time-out period), before going back to a sleep state.

Further, in one embodiment, after association, the coordinator 110 may enter a sleep state. In one embodiment of the sleep state, the coordinator 110 may power-down and/or turn off such that it uses little to no power in the sleep state. In another embodiment, the coordinator 110 may use some power, such as to maintain limited operability, but may not actively transmit/receive information. The coordinator 110 may enter the sleep state if a first condition is met. In one embodiment, the condition is whether the coordinator 110 is idle for a predetermined period of time (e.g., a few seconds). In another embodiment, the user initiates the sleep state such as by pressing a button on the coordinator 110. In yet another embodiment, the coordinator 110 enters the sleep state if there are no commands pending at the coordinator 110 for devices in the same PAN as the coordinator 110. The coordinator 110 may wake up from the sleep state and enter an active state if a second condition is met. In one embodiment, the second condition is met when a user initiates the active state such as by pressing a button on the coordinator 110. In another embodiment, the coordinator 110 wakes up when a command is pending at the coordinator 110 for at least one device in the same PAN as the coordinator 110. In one embodiment of the active state, the coordinator 110 waits to receive a message from the at least one device with a command pending. The message may comprise a polling message to check for pending commands. In response, the coordinator 110 may communicate the command to the at least one device. Accordingly, the coordinator 110 may save power by entering into a sleep state, and only entering an active state under certain conditions as opposed to remaining only in an active state.

Figure 2:
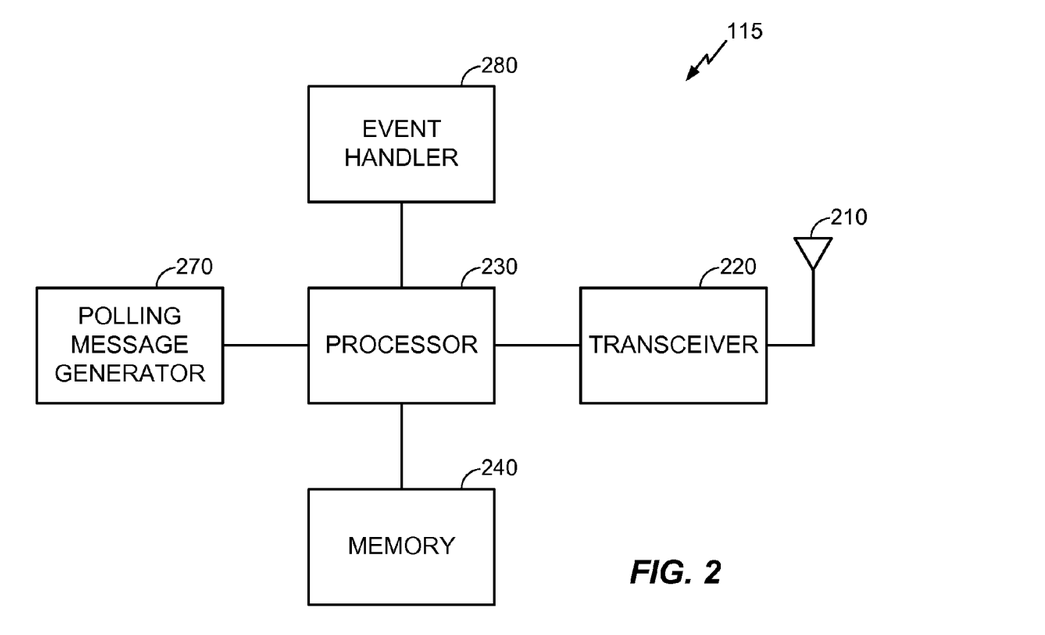
FIG. 2 is a functional block diagram of an exemplary device shown in FIG. 1.

FIG. 2 is a functional block diagram of an exemplary device as shown in FIG. 1. As discussed above with respect to FIG. 1, the device 115 may communicate with the coordinator 110. The device 115 may transmit and receive data (e.g., messages, commands) from the coordinator 110 via an antenna 210. The antenna 210 may further be coupled to a transceiver 220. The transceiver 220 may be configured to modulate and demodulate data transmitted and received from the antenna 210. The transceiver 220 may further be coupled to a processor 230. The processor 230 may process data that is transmitted or received and/or control other components of the device 115. The processor 230 may further be coupled, via one or more buses, to read data from or write data to a memory 240.

The processor 230 may further be coupled to a polling message generator 270. The polling message generator 270 may be configured to generate a polling message to be sent to, for example, the coordinator 110 as discussed with respect to FIG. 1. For example, the polling message generator 270 may generate a polling message. The polling message may comprise information indicative of an identifier of the device 115. The polling message may further comprise information indicative of a request to check for pending messages. The polling message generator 270 may send the polling message to the processor 230 for processing. The processor 230 may send the polling message to the transceiver 220. The transceiver 220 may modulate the polling message and transmit the modulated polling message to the coordinator 110 via the antenna 210.

Further, the device 115 may be configured to receive a message from the coordinator 110 requesting it to perform a command. The device 115 may then perform the command. For example, after the coordinator 110 receives a polling message from the device 115 and determines there is a pending command for the device 115, the coordinator 110 may transmit a message indicative of the command to the device 115. The device 115 receives the message at the transceiver 220. The transceiver 220 may demodulate the message. The processor 230 may then further process the message and/or or store information received in the message in the memory 240. The processor 230 may perform the command or forward the command to an appropriate component of the device 115, such as an event handler 280. The processor may further be coupled to the event handler 280. The event handler 280 may be configured to execute the command received. For example, the event handler 280 may be a switch that switches on/off a light source.

In one embodiment, after the command is performed, the processor 230 may further generate a return message indicating the command has been performed. The processor 230 may send the message to transceiver 220 which modulates the message. The transceiver then transmits the message to the coordinator 110 via the antenna 210.

The processor 230 may be configured to transition the device 115 between an active state and a sleep state as discussed above with respect to FIG. 1. For example, the processor 230 may be configured to adjust the power level and/or turn off/turn on various components of the device 115.

The transceiver 220 may be configured to turn off or reduce power when the device 115 is in the sleep state. Further, the transceiver 220 may be configured to turn on and/or transmit/receive information when the device 115 is in the active state.

Although described separately, it is to be appreciated that functional blocks described with respect to the device 115 need not be separate structural elements. For example, the processor 230 and the memory 240 may be embodied in a single chip. The processor 230 may additionally, or in the alternative, contain memory, such as processor registers. Similarly, two or more of the processor 230, the transceiver 220, the polling message generator 270, and the event handler 280 may be embodied in a single chip. Further, the transceiver 220 may comprise a transmitter, receiver, or both. In other embodiments, the transmitter and receiver are two separate components.

The memory 240 may comprise processor cache, including a multi-level hierarchical cache in which different levels have different capacities and access speeds. The memory 240 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the device 115 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the device 115 may also be implemented as a combination of computing devices, e.g., a combination of a DSP and a microprocessor, a plurality of microprocessors, one or more microprocessors in conjunction with a DSP communication, or any other such configuration.

Figure 3:
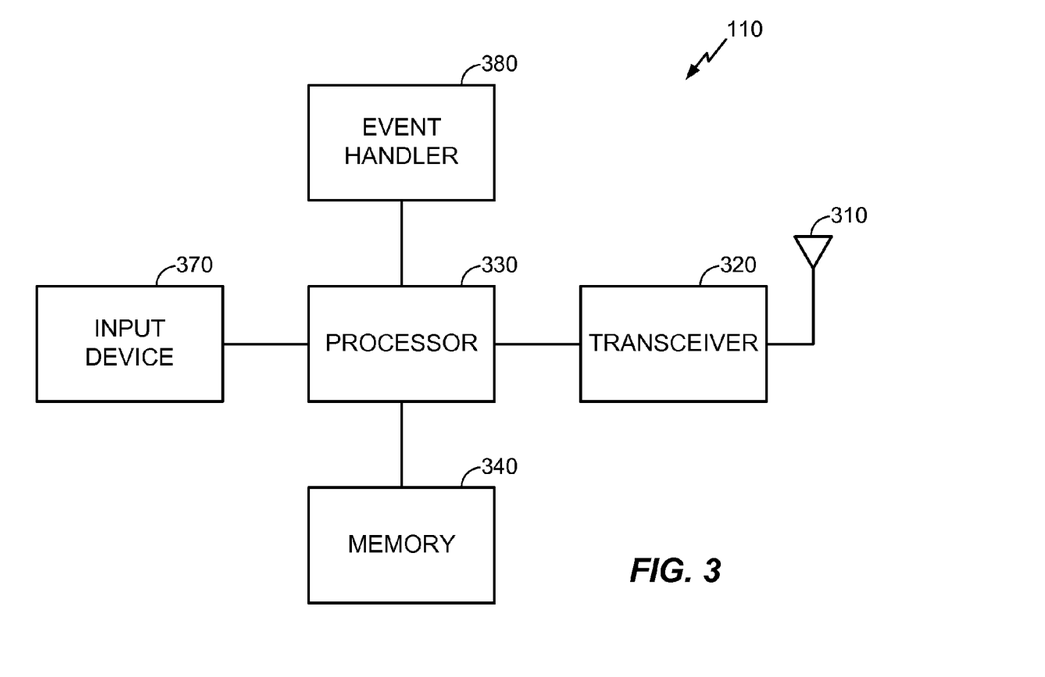
FIG. 3 is a functional block diagram of an exemplary coordinator shown in FIG. 1.

FIG. 3 is a functional block diagram of an exemplary coordinator as shown in FIG. 1. As discussed above with respect to FIG. 1, the coordinator 110 may communicate with one or more devices. The coordinator 110 may transmit and receive data (e.g., polling messages, commands) from the devices 115, 120, 125 via an antenna 310. The antenna 310 may further be coupled to a transceiver 320. The transceiver 320 may be configured to modulate and demodulate data transmitted and received from the antenna 310. The transceiver 320 may further be coupled to a processor 330. The processor 330 may process data that is transmitted or received and/or control other components of the coordinator 110. The processor 330 may further be coupled, via one or more buses, to read data from or write data to a memory 340.

The processor 330 may further be coupled to an input device 370. The input device 370 may be configured to receive an input (e.g., a user input). For example, the input device 370 may comprise one or more physical buttons that a user of the coordinator 110 may press. The input device 370 may transmit information indicative of the input to the processor 330 for further processing and/or storage on the memory 340. The input may comprise a command to be sent to one or more devices (e.g., devices 115, 120, 125). In the alternative or in addition, the input may indicate for the coordinator 110 to enter a sleep state or an active state. The processor 330 may be configured to transition the coordinator 110 between an active state and a sleep state as discussed above with respect to FIG. 1. For example, the processor 330 may be configured to adjust the power level and/or turn off/turn on various components of the coordinator 110.

The processor 330 may further be couple to an event handler 380. The event handler 380 may be configured to respond to polling message received from one or more devices (e.g., devices 115, 120, 125). For example, the coordinator 110 may receive a polling message from the device 115 at the transceiver 320 via the antenna 310. The transceiver 320 may demodulate the polling message. The processor 330 may then further process the message and/or or store information received in the message in the memory 340. The processor 330 may forward the polling message to the event handler 380. The event handler 380 may be configured to determine the device that sent the polling message. For example, the polling message may comprise an identifier of the device 115. Further, the event handler 380 may be configured to determine if there is a message pending for the device 115. For example, the memory 340 may comprise a queue where pending commands are stored. The event handler 380 may access memory 340 to determine if any pending command(s) are on the queue for the device 115. The event handler 380 may further be configured to generate a response message indicative of one or more pending command(s) or indicative of no commands pending. The event handler 380 may forward the response message to the processor 330 for processing. The processor 330 may send the processed response message to the transceiver 320. The transceiver 320 may modulate the response message and transmit the response message to the device 115 via the antenna 310.

The transceiver 320 may be configured to turn off or reduce power when the coordinator 110 is in the sleep state. Further, the transceiver 320 may be configured to turn on and/or transmit/receive information when the coordinator 110 is in the active state.

Although described separately, it is to be appreciated that functional blocks described with respect to the coordinator 110 need not be separate structural elements. For example, the processor 330 and the memory 340 may be embodied in a single chip. The processor 330 may additionally, or in the alternative, contain memory, such as processor registers. Similarly, two or more of the processor 330, the transceiver 320, and the event handler 380 may be embodied in a single chip. Further, the transceiver 320 may comprise a transmitter, receiver, or both. In other embodiments, the transmitter and receiver are two separate components.

The memory 340 may comprise processor cache, including a multi-level hierarchical cache in which different levels have different capacities and access speeds. The memory 340 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

The input device 370 may comprise, but is not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, and/or a microphone (possibly coupled to audio processing software to, e.g., detect voice commands).

One or more of the functional blocks and/or one or more combinations of the functional blocks described with respect to the coordinator 110 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the coordinator 110 may also be implemented as a combination of computing devices, e.g., a combination of a DSP and a microprocessor, a plurality of microprocessors, one or more microprocessors in conjunction with a DSP communication, or any other such configuration.

Figure 4:
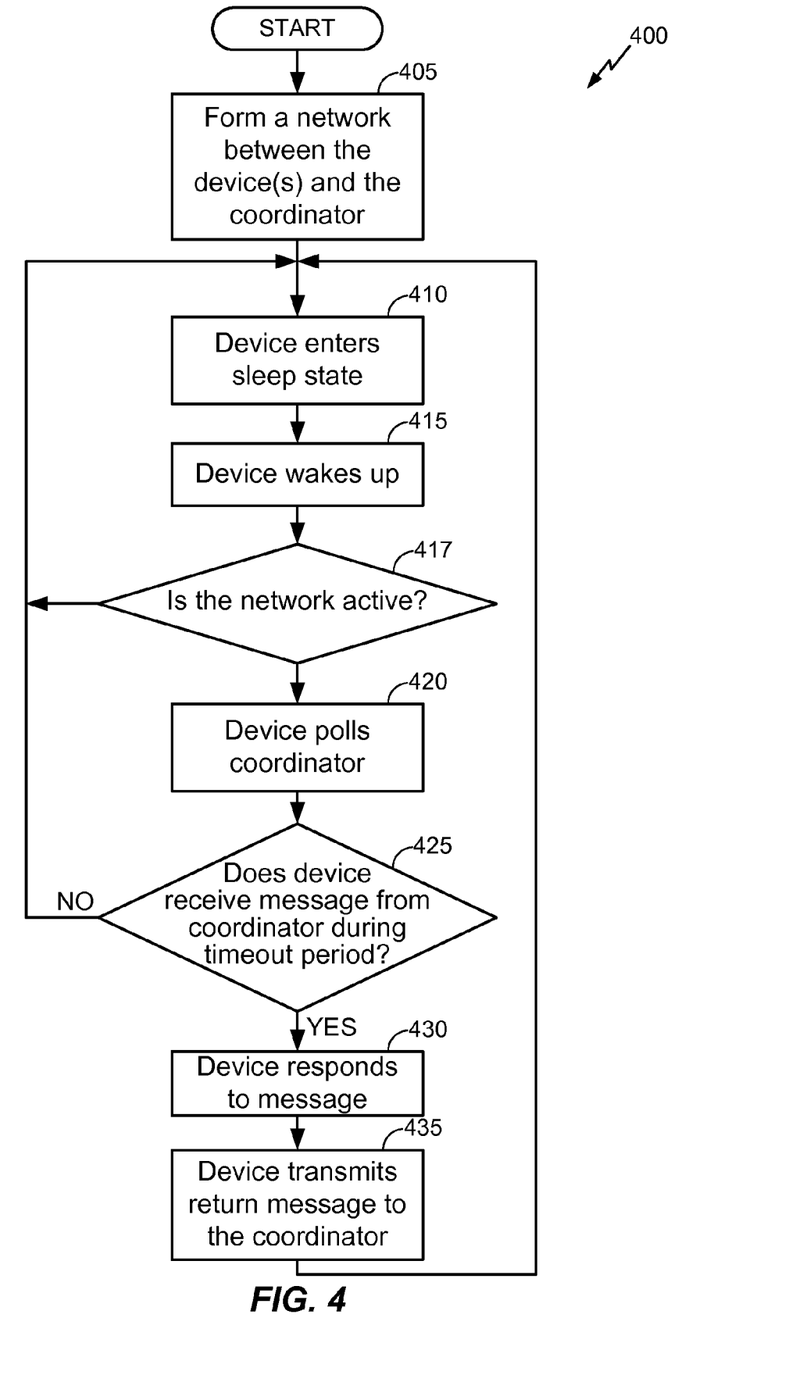
FIG. 4 is a flowchart of an exemplary process of a device communicating with a coordinator shown in FIG. 1.

FIG. 4 is a flowchart of an exemplary process of a device communicating with a coordinator shown in FIG. 1. At a step 405, at least one of the devices 115, 120, 125 pair (e.g., form a network) with the coordinator 110. Continuing at a step 410, the at least one of the devices 115, 120, 125 enters a sleep state. Further, at a step 415, at least one of the devices 115, 120, 125 wakes up. For example, the at least one of the devices 115, 120, 125 may wake up after a predetermined time period (e.g., a few seconds). Continuing at a step 417, the at least one of the devices 115, 120, 125 determines if the network formed with the coordinator 110 is active (e.g., the coordinator 110 is in an active state). If at step 417, the at least one of the devices 115, 120, 125 determines that the network is not active, the process 400 returns to step 410. If at step 417, the at least one of the devices 115, 120, 125 determines that the network is active, the process 400 continues to step 420. At the step 420, the at least one of the devices 115, 120, 125 sends a polling message to the coordinator 110. At a step 425 the at least one of the devices 115, 120, 125 determines if a response message is received from the coordinator 110 within a predetermined timeout period (e.g., a few seconds). The response message may comprise a command to be executed by at least one of the devices 115, 120, 125. If the at least one of the devices 115, 120, 125 determines a response message is not received, the process 400 returns to the step 410. If the at least one of the devices 115, 120, 125 determines a response message is received, the process 400 continues to a step 430. At the step 430 the at least one of the devices 115, 120, 125 responds to the response message. For example, the at least one of the devices 115, 120, 125 may execute a command included in the response message. At an optional step 435, the at least one of the devices 115, 120, 125 transmits a return message to the coordinator 110 indicating the at least one of the devices 115, 120, 125 has responded to the message. Further, the process 400 returns to the step 410.

Figure 5:
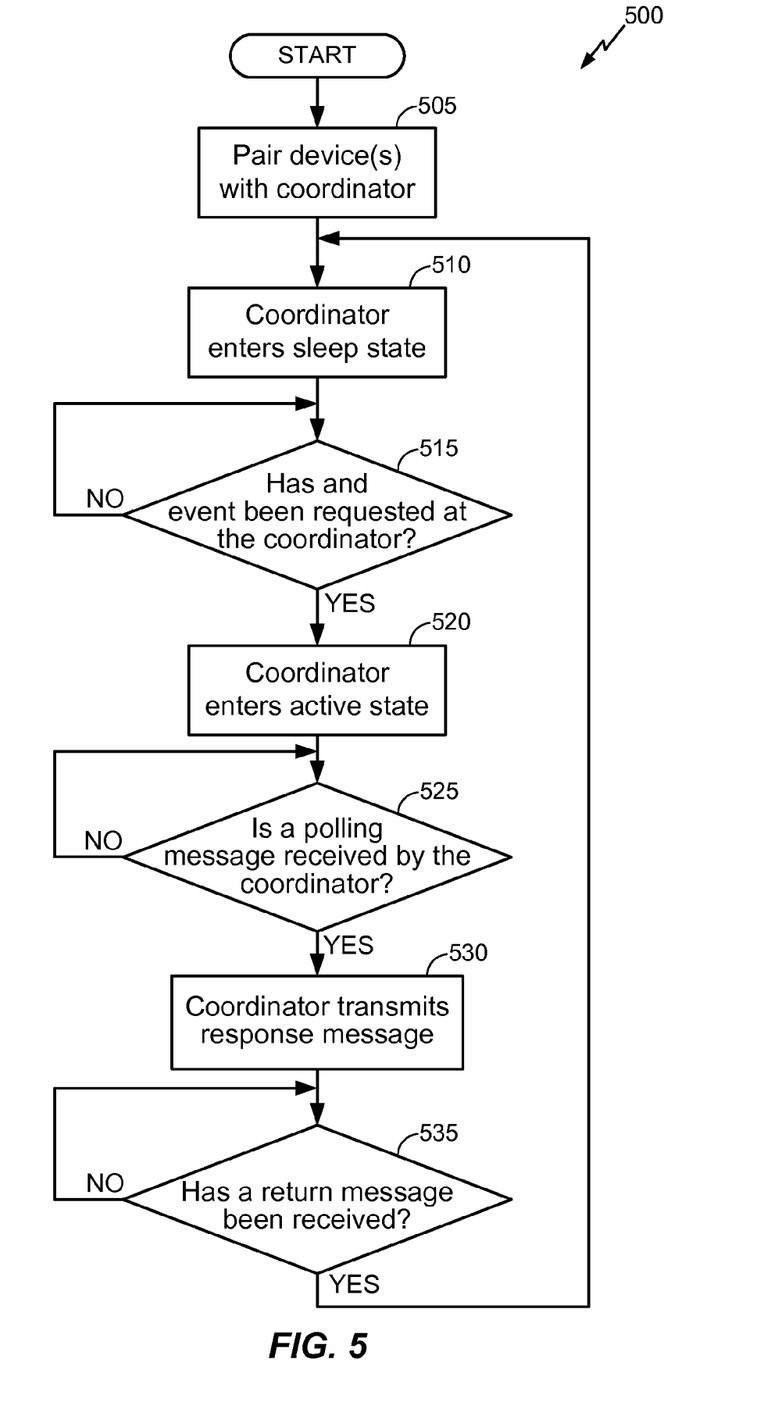
FIG. 5 is a flowchart of an exemplary process of a coordinator communicating with a device shown in FIG. 1.

FIG. 5 is a flowchart of an exemplary process of a coordinator communicating with a device shown in FIG. 1. At a step 505, at least one of the devices 115, 120, 125 pair with the coordinator 110. Continuing at a step 510, the coordinator 110 enters a sleep state. Further, at a step 515, the coordinator 110 determines if an event has occurred at the coordinator 110 to wake up the coordinator 110 as discussed with respect to FIG. 1. For example, the coordinator 110 determines if a command is pending for the at least one of the devices 115, 120, 125. If the coordinator 110 determines an event has not occurred, the process 500 returns to the step 515. If the coordinator 110 determines an event has occurred, the process 500 continues to a step 520. At the step 520, the coordinator 110 wakes up and enters an active state. Next, at a step 525, the coordinator 110 determines if a polling message is received from the at least one of the devices 115, 120, 125. The polling message may comprise an identifier of the at least one of the devices 115, 120, 125 and/or a request to check for a pending command. If the coordinator 110 determines a polling message is not received, the process 500 returns to the step 525. If the coordinator 110 determines a polling message is received from the at least one of the devices 115, 120, 125, the process continues to the step 530. At the step 530, the coordinator 110 transmits a response message indicative of a command pending for the at least one of the devices 115, 120, 125 to the at least one of the devices 115, 120, 125. At an optional step 535, the coordinator 110 determines if a return message indicating that the command has been performed is received from the at least one of the devices 115, 120, 125. If the coordinator 110 determines the return message has not been received, the process returns to the step 535. If the coordinator 110 determines the return message has been received, the process returns to the step 510.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the scope of the invention. As will be recognized, the invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A personal area network (PAN) coordinator comprising:
a queue configured to store a command;
a processor; and
a memory storing instructions that are executable by the processor to cause the processor to:
form a wireless PAN with one or more devices;
transition the PAN coordinator from an active state to a sleep state subsequent to a first condition being met;
determine whether a second condition has been met to wake up the PAN coordinator;
transition the PAN coordinator from the sleep state to the active state based on determining that the second condition has been met, wherein the second condition comprises at least one of a user activation of the PAN coordinator and the command pending for a device of the one or more devices; and
after transitioning the PAN coordinator from the sleep state to the active state, await receipt of a message from the device wherein the message polls the PAN coordinator to determine whether the command is pending in the queue.

2. The PAN coordinator of claim 1, further comprising a transceiver configured to communicate with the device, wherein:
the command indicates a job that is to be performed by the device;
the transceiver receives the message from the device; and
the transceiver transmits to the device an indication of whether the command is pending in the queue.

3. The PAN coordinator of claim 1, wherein:
the wireless PAN is a first network, and
the PAN coordinator forms a root of the first network, stores information about the first network, cannot send or receive data in the sleep state, and acts as a bridge to a second network.

4. The PAN coordinator of claim 1, wherein the message is a polling message, and wherein after transitioning the PAN coordinator from the sleep state to the active state:
the wireless PAN is available to the one or more devices; and
the processor receives the polling message from the device.

5. The PAN coordinator of claim 1, wherein:
the PAN coordinator further comprises an event handler; and
after transitioning the PAN coordinator from the sleep state to the active state, the event handler receives the message from the processor and determines whether the command is pending in the queue.

6. The PAN coordinator of claim 1, wherein the first condition comprises the PAN coordinator being idle for a period of time or the first condition comprises the PAN coordinator receiving a user input requesting the PAN coordinator to enter the sleep state.

7. The PAN coordinator of claim 1, wherein the first condition comprises the command not pending in the queue.

8. The PAN coordinator of claim 1, wherein the user activation of the PAN coordinator comprises receiving a user input requesting the PAN coordinator to enter the active state.

9. The PAN coordinator of claim 1, wherein:
the second condition comprises the command pending in the queue; and
the command indicates a job that is to be performed by the device.

10. The PAN coordinator of claim 1, wherein:
the PAN coordinator further comprises a transceiver that is powered off in the sleep state, and
the PAN coordinator cannot send or receive data in the sleep state.

11. A method comprising:
forming a wireless personal area network (PAN) between a PAN coordinator and a device;
transitioning the PAN coordinator from an active state to a sleep state subsequent to a first condition being met;
determining whether a second condition has been met to wake up the PAN coordinator;
transitioning the PAN coordinator from the sleep state to the active state based on determining that the second condition has been met, wherein the second condition comprises at least one of a user activation of the PAN coordinator and a command pending for the device in the PAN coordinator; and
after transitioning the PAN coordinator from the sleep state to the active state, awaiting receipt of a message from the device wherein the message polls the PAN coordinator to determine whether the command is pending in the PAN coordinator.

12. The method of claim 11, wherein the PAN coordinator comprises a transceiver configured to communicate with the device, and wherein the transceiver is powered-off when the PAN coordinator is in the sleep state.

13. The method of claim 12, wherein the PAN coordinator cannot send or receive data in the sleep state.

14. The method of claim 11, wherein:
the wireless PAN is a first network,
the PAN coordinator forms a root of the first network, stores information about the first network, stores multiple commands in a queue, and acts as a bridge to a second network, and
the method further comprises enabling the first network subsequent to the PAN coordinator transitioning from the sleep state to the active state.

15. The method of claim 11, wherein the first condition comprises the PAN coordinator being idle for a period of time.

16. The method of claim 11, wherein the first condition comprises receiving a user input requesting the PAN coordinator to enter the sleep state.

17. The method of claim 11, wherein the first condition comprises the command not pending in a queue of the PAN coordinator.

18. The method of claim 11, wherein the user activation of the PAN coordinator comprises an input requesting the PAN coordinator to enter the active state.

19. The method of claim 11, wherein the second condition comprises the command pending in a queue of the PAN coordinator.

20. The method of claim 11, wherein the command indicates a job to be performed by the device, and wherein the method further comprises:
- receiving the message by the PAN coordinator; and
- responding to the message with an indication by the PAN coordinator that the command is pending in a queue of the PAN coordinator.

21. A PAN coordinator comprising:
- means for storing a command;
- means for forming a wireless personal area network (PAN) between the PAN coordinator and one or more devices;
- means for transitioning from an active state to a sleep state subsequent to a first condition being met; and
- means for transitioning from the sleep state to the active state based on determining that a second condition has been met, wherein the second condition comprises at least one of a user activation of the PAN coordinator and the command pending in the means for storing for a device, wherein after transitioning from the sleep state to the active state the PAN coordinator awaits receipt of a message from the device, and wherein the message polls the PAN coordinator to determine whether the command is pending in the means for storing.

22. A non-transitory computer-readable medium comprising program code that, when executed by a processor of a personal area network (PAN) coordinator, causes the processor to:
- initiate formation of a wireless PAN with a device;
- transition the PAN coordinator from an active state to a sleep state subsequent to a first condition being met;
- determine whether a second condition has been met to wake up the PAN coordinator;
- transition the PAN coordinator from the sleep state to the active state based on determining that the second condition has been met, wherein the second condition comprises at least one of a user activation of the PAN coordinator and a command pending for the device in the PAN coordinator; and
- after transitioning the PAN coordinator from the sleep state to the active state, await receipt of a message from the device wherein the message polls the PAN coordinator to determine whether the command is pending in the PAN coordinator.

23. The PAN coordinator of claim 1, wherein the queue is configured to store multiple commands.

* * * * *